(12) United States Patent
Daley, III

(10) Patent No.: US 8,125,770 B2
(45) Date of Patent: Feb. 28, 2012

(54) BAG COMPUTER INPUT OUTPUT DEVICE

(76) Inventor: Charles A. Daley, III, Rawai (TH)

( * ) Notice: Subject to any disclaimer, the term of this patent is extended or adjusted under 35 U.S.C. 154(b) by 155 days.

(21) Appl. No.: 12/454,327

(22) Filed: May 18, 2009

(65) Prior Publication Data

US 2009/0225508 A1 Sep. 10, 2009

Related U.S. Application Data

(63) Continuation-in-part of application No. 11/796,920, filed on May 1, 2007, now abandoned.

(60) Provisional application No. 61/128,954, filed on May 28, 2008.

(51) Int. Cl.
*G06F 1/16* (2006.01)
(52) U.S. Cl. .................................. 361/679.03; 206/720
(58) Field of Classification Search .............. 361/679.03
See application file for complete search history.

(56) References Cited

U.S. PATENT DOCUMENTS

| | | | | |
|---|---|---|---|---|
| 5,217,119 A * | 6/1993 | Hollingsworth | ............ | 206/583 |
| 5,222,642 A * | 6/1993 | Solarz | ............ | 224/191 |
| 5,445,266 A * | 8/1995 | Prete et al. | ............ | 206/320 |
| 5,494,157 A * | 2/1996 | Golenz et al. | ............ | 206/320 |
| 5,678,666 A * | 10/1997 | Shyr et al. | ............ | 190/102 |
| 5,774,338 A * | 6/1998 | Wessling, III | ............ | 361/730 |
| 5,887,723 A * | 3/1999 | Myles et al. | ............ | 206/760 |
| 5,887,777 A * | 3/1999 | Myles et al. | ............ | 224/578 |
| 5,908,147 A * | 6/1999 | Chuang | ............ | 224/607 |
| 6,105,764 A * | 8/2000 | Scicluna et al. | ............ | 206/320 |
| 6,161,738 A * | 12/2000 | Norris | ............ | 224/153 |
| 6,283,299 B1 * | 9/2001 | Lee | ............ | 206/760 |
| 6,393,745 B1 * | 5/2002 | Miki | ............ | 40/586 |
| 6,597,568 B2 * | 7/2003 | Ryder | ............ | 361/679.55 |
| 6,685,016 B2 * | 2/2004 | Swaim et al. | ............ | 206/320 |
| 6,763,942 B1 * | 7/2004 | Yeh | ............ | 206/320 |
| 6,769,588 B2 * | 8/2004 | Zheng | ............ | 224/576 |
| 6,956,614 B1 * | 10/2005 | Quintana et al. | ............ | 348/373 |
| 6,962,277 B2 * | 11/2005 | Quintana et al. | ............ | 224/262 |
| 7,265,970 B2 * | 9/2007 | Jordan | ............ | 361/679.27 |
| 7,821,779 B2 * | 10/2010 | Daley, III | ............ | 361/679.02 |
| 7,876,558 B2 * | 1/2011 | Daley, III | ............ | 361/679.55 |
| 7,881,048 B2 * | 2/2011 | Daley, III | ............ | 361/679.03 |
| 7,889,496 B2 * | 2/2011 | Daley, III | ............ | 361/679.55 |
| 7,894,179 B2 * | 2/2011 | Daley, III | ............ | 361/679.03 |
| 2004/0134813 A1 * | 7/2004 | Domotor | ............ | 206/320 |

(Continued)

FOREIGN PATENT DOCUMENTS

JP 2004097801 A * 4/2004

*Primary Examiner* — Lisa Lea Edmonds

(57) ABSTRACT

Disclosed is an improvement to the bag computer of application Ser. No. 11/796,920. The bag computer has a pivoting display panel near its top front which can store against the bag front or pivot into the line of sight of the bag computer wearer/operator. To accommodate the computer input of typed or written information the bag computer may have a pivoting input device on the bag front. The input device may mount on a pivoting cover which covers the display panel when in storage or the input device may have a separate pivoting mount. To gain advantage through multiple components, the input device may be divided into a body which pivotally attaches to the bag front and a removable insert which may be adapted to alternatively accept typed or written input. Thus, the input device may be quickly changed from a cover to a keyboard or to an electronic write pad.

37 Claims, 6 Drawing Sheets

U.S. PATENT DOCUMENTS

| | | | |
|---|---|---|---|
| 2005/0000843 A1* | 1/2005 | Zheng | 206/457 |
| 2005/0011920 A1* | 1/2005 | Feng | 224/275 |
| 2005/0045673 A1* | 3/2005 | Godshaw et al. | 224/153 |
| 2005/0103815 A1* | 5/2005 | Lee et al. | 224/275 |
| 2006/0042996 A1* | 3/2006 | Picot et al. | 206/586 |
| 2006/0113203 A1* | 6/2006 | Daley | 206/320 |
| 2006/0113213 A1* | 6/2006 | Daley | 206/576 |
| 2006/0144663 A1* | 7/2006 | Gullen et al. | 190/110 |
| 2006/0163303 A1* | 7/2006 | Trutanich | 224/576 |
| 2007/0151881 A1* | 7/2007 | Zheng | 206/320 |
| 2007/0199844 A1* | 8/2007 | Daley, III | 206/320 |
| 2007/0199851 A1* | 8/2007 | Yau | 206/472 |
| 2007/0201201 A1* | 8/2007 | Daley, III | 361/683 |
| 2008/0161753 A1* | 7/2008 | Gillespie et al. | 604/65 |
| 2008/0192421 A1* | 8/2008 | Daley | 361/681 |
| 2008/0237250 A1* | 10/2008 | Swansey | 220/756 |
| 2008/0273298 A1* | 11/2008 | Daley | 361/683 |
| 2008/0289886 A1* | 11/2008 | Burkitt | 178/18.03 |
| 2009/0009476 A1* | 1/2009 | Daley, III | 345/168 |
| 2009/0009938 A1* | 1/2009 | Daley, III | 361/680 |
| 2009/0027632 A1* | 1/2009 | Choi | 353/98 |
| 2009/0046416 A1* | 2/2009 | Daley, III | 361/679.55 |
| 2009/0107877 A1* | 4/2009 | Daley, III | 206/576 |
| 2009/0107878 A1* | 4/2009 | Daley, III | 206/576 |
| 2009/0141446 A1* | 6/2009 | Daley, III | 361/679.55 |
| 2009/0185342 A1* | 7/2009 | Daley, III | 361/679.27 |
| 2009/0190296 A1* | 7/2009 | Daley, III | 361/679.27 |
| 2009/0201637 A1* | 8/2009 | Daley, III | 361/679.29 |
| 2009/0225508 A1* | 9/2009 | Daley, III | 361/679.27 |
| 2009/0225509 A1* | 9/2009 | Daley, III | 361/679.29 |
| 2009/0236247 A1* | 9/2009 | Daley, III | 206/320 |
| 2009/0284908 A1* | 11/2009 | Daley, III | 361/679.17 |
| 2010/0050485 A1* | 3/2010 | Forte et al. | 40/1.5 |
| 2010/0193384 A1* | 8/2010 | Daley, III | 206/320 |
| 2010/0219221 A1* | 9/2010 | Zheng | 224/576 |
| 2010/0220434 A1* | 9/2010 | Daley, III | 361/679.27 |
| 2010/0256561 A1* | 10/2010 | Gillespie et al. | 604/151 |
| 2011/0032669 A1* | 2/2011 | Daley, III | 361/679.03 |
| 2011/0051349 A1* | 3/2011 | Daley, III | 361/679.27 |
| 2011/0051362 A1* | 3/2011 | Daley, III | 361/679.55 |

* cited by examiner

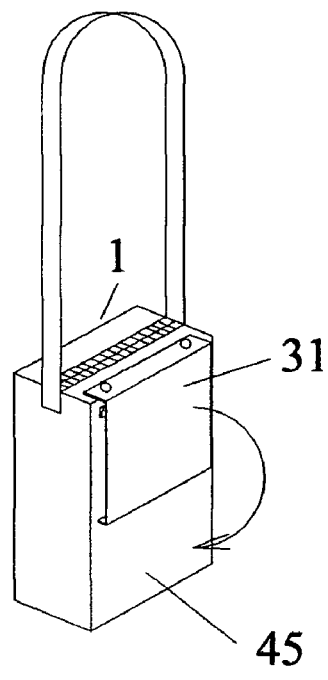
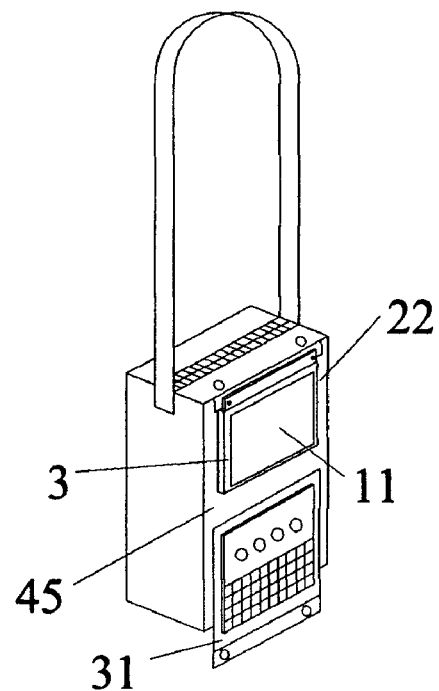
FIG. 1
FIG. 2
FIG. 4A
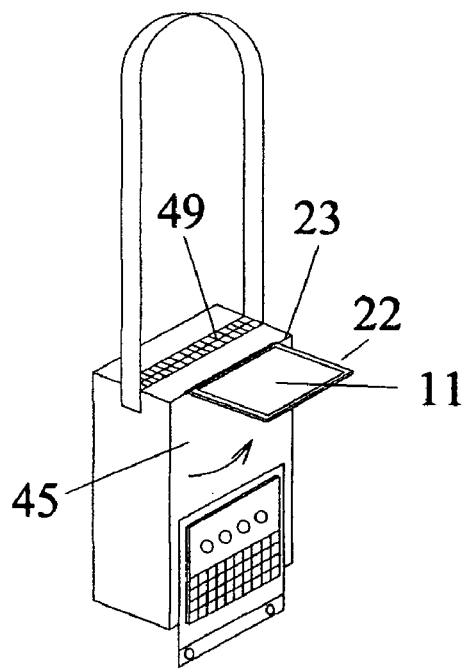
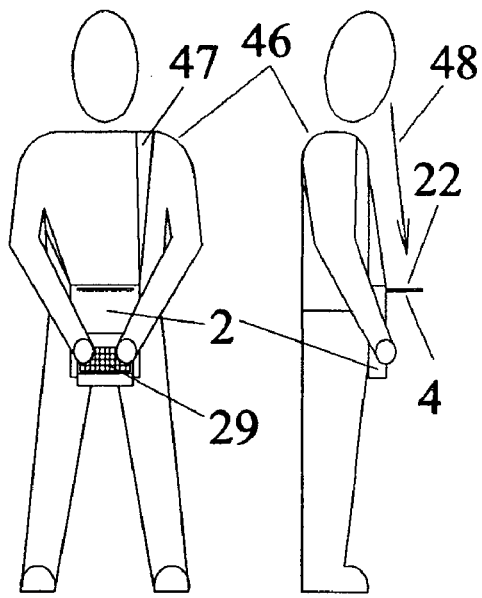
FIG. 3
FIG. 4B

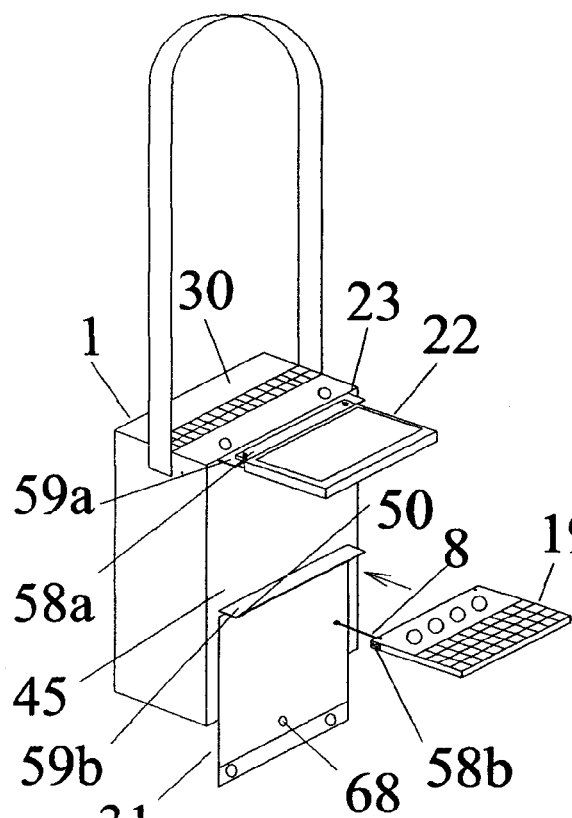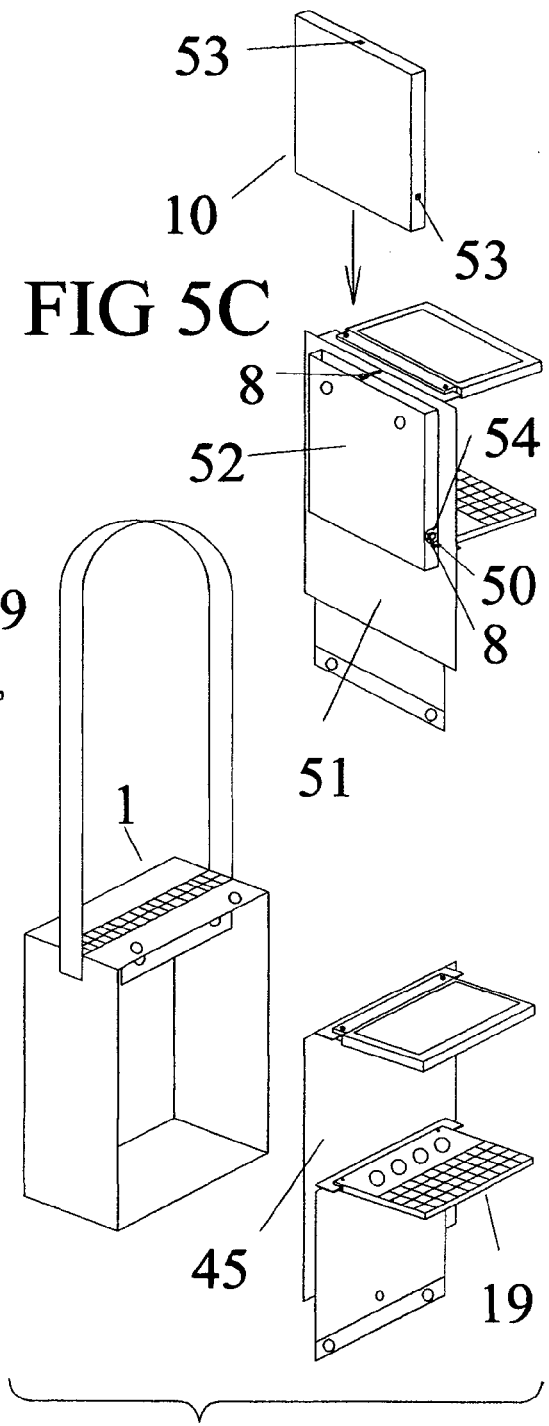

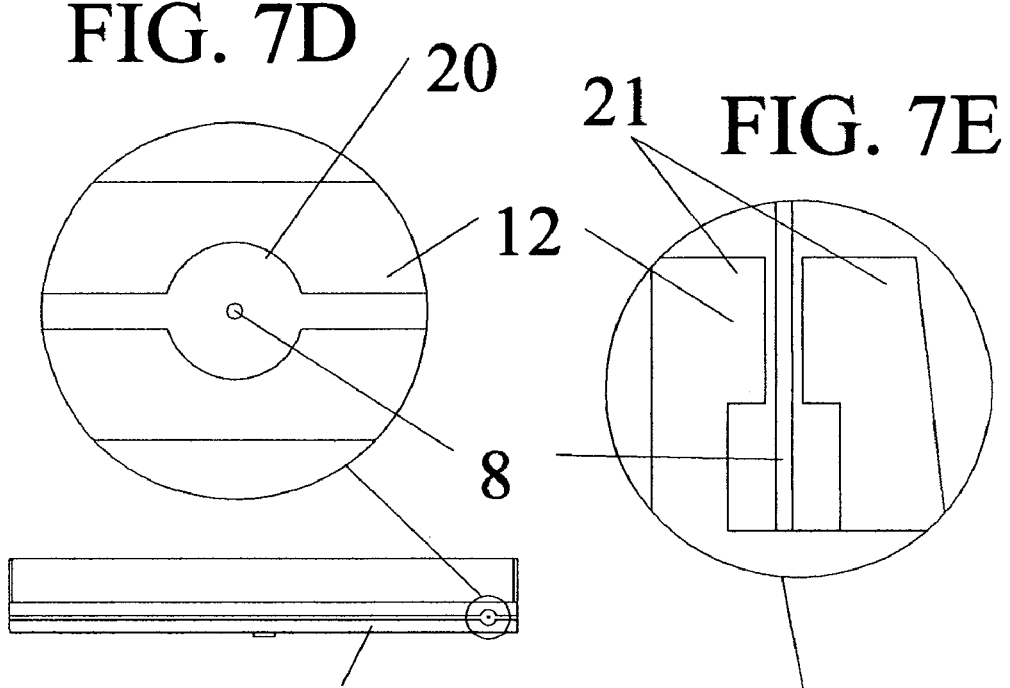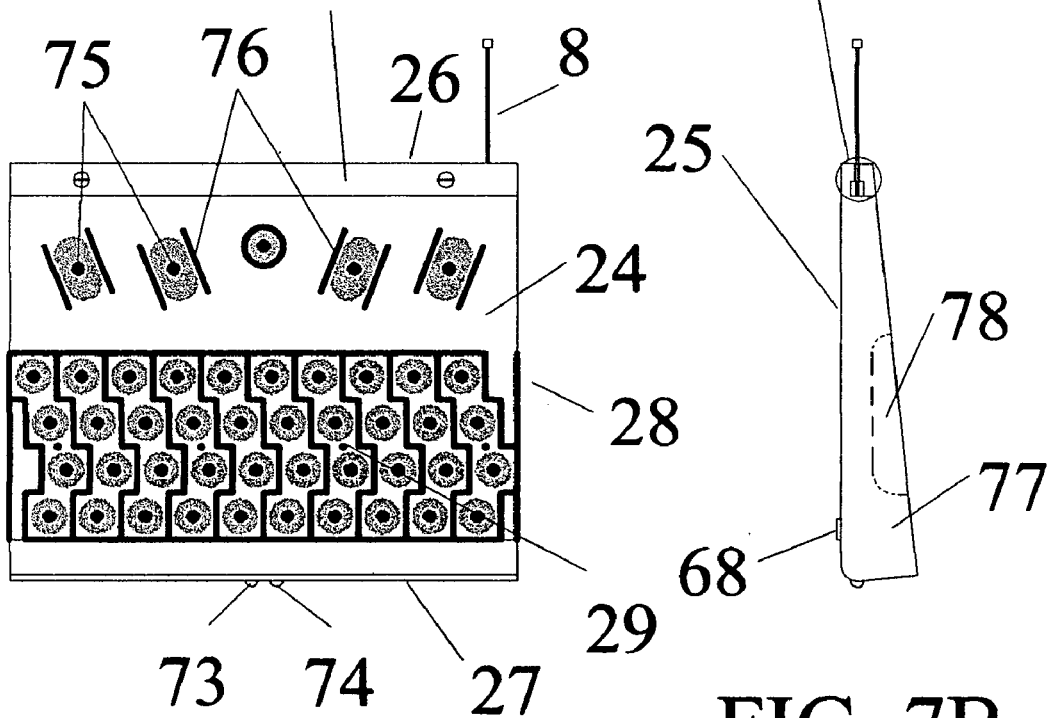

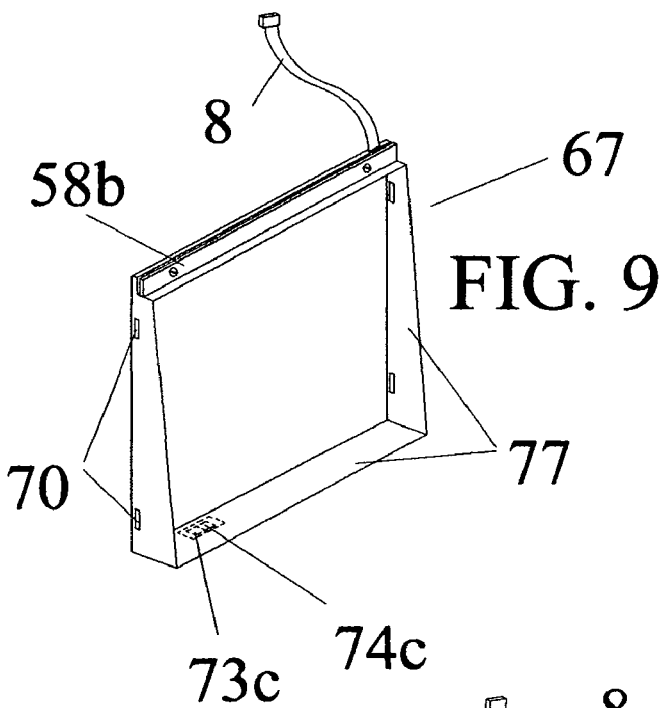
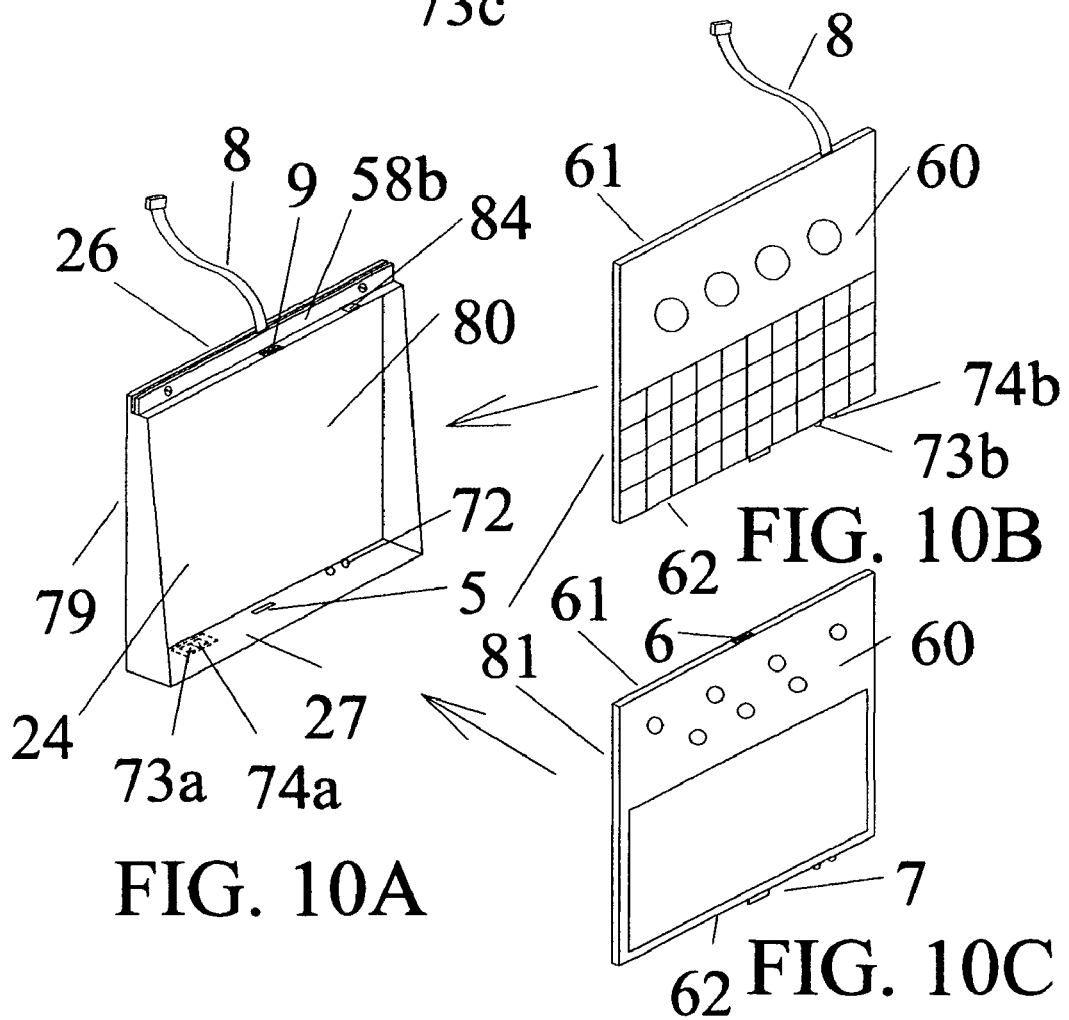

BAG COMPUTER INPUT OUTPUT DEVICE

CROSS-REFERENCE TO RELATED APPLICATIONS

This application is a Continuation-In-Part and claims the filing benefit under 35 U.S.C. §120 of U.S. application Ser. No. 11/796,920, filed May 1, 2007 now abandoned and is incorporated herein by reference.

This application claims the filing benefit under 35 U.S.C. §119(e) of U.S. Provisional Application No. 61/128,954, filed on May 28, 2008, the entire teachings of which are incorporated herein by reference.

TECHNICAL FIELD

The present invention relates to a computer designed for mobile use.

BACKGROUND OF THE INVENTION

Bag computers are composed of a bag and computer joined so that the display panel pivots around the top front end of the bag so it can lay approximately flat against the bag front when stored or pivot with its display facing outward into the line of sight of the operator when in use. There may be a keyboard lower down on the bag front and there may be manual controls on the back of the display panel.

The bag computer was described in application Ser. No. 11/796,920. This application is a continuation on those inventions.

One characteristic of the most popular computers is division into components. This allows the computer owner to buy or replaces less expensive individual components when needed. Choice can be made between various prices and makers so the owner can optimize the result of his array of options. Manufacturers, as well, may benefit from being able to concentrate of the production of one type of component. This invention aims to build on the bag computer concept by encouraging owner replaceable components for bag computers.

BRIEF DESCRIPTION OF THE INVENTION

This invention is a continuation of and improvement to the bag computer invention Ser. No. 11/796,920. A bag computer is a bag with a display panel pivotally attached to it so that the display panel can pivot from a storage position approximately flat against the bag's front wall to an operating position away from the bag so that the display is in the line of sight of the operator/wearer and he can view the display. The display panel may be attached near the junction of the top and front walls so that the display is as near as possible to the operator/wearer and have the greatest apparent display size. There may be a primary cover and this may have a manual character input device, such as a keyboard, on the inside surface so that the input device and display are hidden when the cover is closed and but available for use when the cover flap is opened. The primary cover may pivot near the center of the bag's front and close by pivoting up and attaching to attachments near the top of the bag. On the back side of the display panel opposite the display, in other words facing downward as the operators views the display, there may be controls, such as a touch pad, that may be operated with the operator's fingers while holding the display panel. The bag computer's computing unit may be in the display panel or may be mounted separately to the inside or outside of the bag. The majority of the bag interior is available for everyday cargo or peripherals which are accessible though an opening in the bag's top wall.

The display panel may be removable from the bag. This may be done by using a pivoting computer equipment mount (PCEM) which is comprised of a bag part and a display panel part which have complimentary attachments. One or both of these parts may include the hinge means or be part of the hinge means which allows the display to pivot on the bag.

The PCEMs hinge means may be able to hold any angular position relative to the bag front. Instead, the display panel position may be maintained with a display panel prop which removably spans between the bag front and display panel back.

In addition to the display, the display panel may have controls, display panel prop holders or finger guides on its back side. There may be an input/output tool, such as camera, microphone or communication antenna, on the distal edge of the display panel (opposite the PCEM).

The bag computer may also have a manual character input device (MCID) removably and pivotally mounted to the bag front. The MCID is panel-like and may include a keyboard or electronic write pad or similar input device for hand use. The MCID electrically connected to the bag computer's computing unit with an electrical connection, for example a wire and plug, from the MCID through the bag's front wall to the computing unit in the bag's interior. When the bag's primary cover is covering the display panel, the MCID cannot be seen. When opened and pivoted downward, the MCID is exposed and the operators can type with two hands and relaxed arms.

The MCID may be attached to the inside of the primary cover. In this case the MCID may have attachments on its back or edges to match attachments on the inside of the bag's primary cover.

Alternatively, there may be a second PCEM attachment for the MCID. This is located between the primary cover's attachment to the bag front and the display panel PCEM so that when the primary cover is closed is will cover both the display panel and the MCID. As with the display panel, the MCID has a MCID part PCEM near one edge and this matched the bag part PCEM on the bag.

The MCID may include a keyboard and this may be 10 keys wide, include tactile finger guides, may have thumb keys to substitute keys normally found further to the right of left on a standard keyboard.

The MCID may have alignment structures to fit the MCID to the display panel and may form a box-like secondary cover open on one side to cover and protect the display panel when in storage position.

The MCID may be a protective secondary cover for the display panel with no electronics. The secondary cover may include a distally mounted camera or communicator.

The MCID may form an input device body which covers the display panel and includes a receptacle with electrical connection to hold a removable MCID input device insert and connect it through the bag's front wall to a computing unit inside the bag. The MCID insert may be a keyboard or electronic write pad or other input device which fits and electrical connects to the receptacle. The input device body or input device insert may have a camera or communicator antenna on its distal edge where it may be aimed at targets. The input device inserts may be electrically connected to the bag's computing unit directly or, alternatively, first to the input device body and from there with a separate connection through the bag's front wall to the computing unit in the bag. As with the MCID or secondary cover, the input device body may be attached to the bag using a PCEM or by attaching it to the inside surface of the bag's primary cover.

BRIEF DESCRIPTION OF THE SEVERAL VIEWS OF THE DRAWINGS

FIG. 1 The bag computer is seen here in storage position with its display panel parallel to and adjacent to the bag's front wall and the cover over the display panel.

FIG. 2 Here the bag computer has its display panel in the same position as in FIG. 1 but the cover is open.

FIG. 3 Here the bag computer is in operating position with its display pivoted out into the line of sight of the wearer/operator.

FIG. 4A This is a front view of a manikin wearing and operating the bag computer. His hands are manipulating the keyboard on the pivoting manual character input device (MCID).

FIG. 4B This is a side view of a manikin wearing and operating the bag computer. His hands are manipulating a keyboard on the manual character input device (MCID) panel.

FIG. 5A In this view of the bag computer the MCID panel is pivotally attached to the bag using complimentary pivoting computer equipment mounts (PCEM).

FIG. 5B This is an exploded view of the bag computer with the front wall removed.

FIG. 5C This is a view of the inside surface of the bag computer's front wall showing the computing unit and its mounting assembly.

FIG. 7A This is a front side view of the MCID which is, in this case, a keyboard.

FIG. 7B This is a side edge view of the MCID. The alignment structures form the walls of a box-like structure which covers, conceals and protects the display panel when in stored position.

FIG. 7C This is a view of the attachment edge of the MCID and the MCID mounting attachments found there.

FIG. 7D This is a magnified attachment edge view of the part of the attachment edge where the electrical connection from the MCID to the computing unit in the bag interior is found.

FIG. 7E This is a magnified side edge view of the part of the attachment edge where the electrical connection from the MCID to the computing unit in the bag interior is found.

FIG. 9 This drawings shown that the MCID may be just a cover with no electronics in it.

FIG. 10A This drawings shows the MCID as an input device holder with a receptacle to removably hold a variety of manual character input device inserts.

FIG. 10B This is a keyboard insert made to fit in the MCID receptacle.

FIG. 10C This is an electronic write pad insert made to fit in the MCID receptacle.

DETAILED DESCRIPTION OF THE INVENTION

Figure 6:
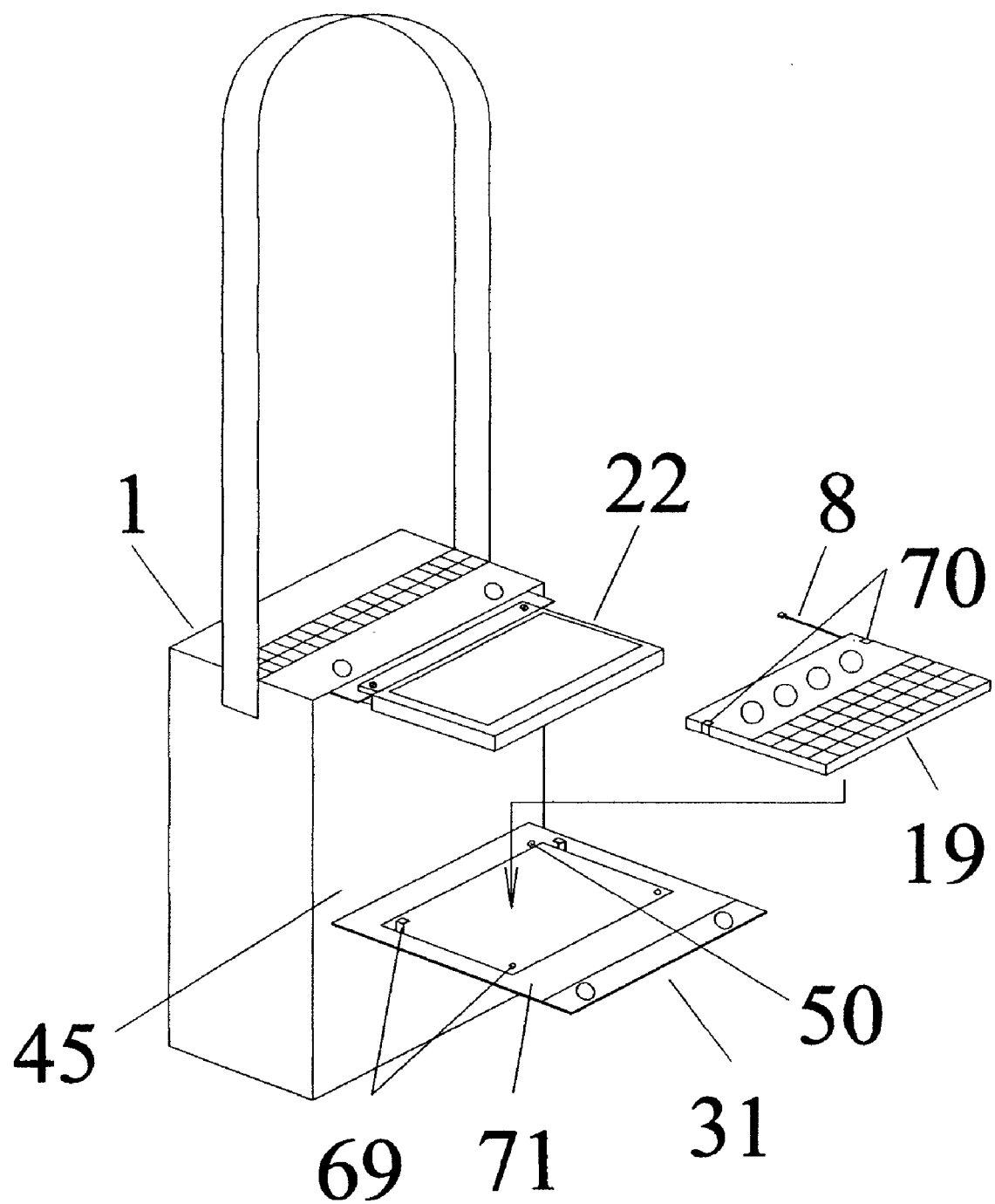
FIG. 6 In this view of the bag computer the MCID panel is pivotally attached to the bag by mounting the panel on the inside of the pivoting cover.

A bag computer is a bag with a display panel, including input/output devices such as a display and graphic user input device, pivotally attached to the exterior of the bag so it may pivot horizontally from a storage position parallel to and adjacent the bag's front wall to an operating position away from the bag's front wall where the wearer/operator may view it. The bag computer's computing unit may be found in the display panel or elsewhere mounted to the bag's interior or exterior and is electrically connected to the display panel. A manual character input device (MCID) such as a keyboard or electronic write pad may also be pivotally attached to the bag front. The bag computer may be seen as a system of components to facility the mobile use of a computer.

FIGS. 1, 2 and 3 show how a bag computer is deployed and used. As shown in FIG. 1 the display panel, when pivotally attached to the bag 1, is stored against the bag front 45 and may be covered with a cover, such as a cover flap 31 or rigid shaped cover. Shown in FIG. 2, when the cover 31 is repositioned, the display panel 22 is exposed for use. Here it can be seen that the display panel is in storage position with its front side 3, including display 11, and back side approximately parallel to the bag front wall exterior 45 and its back side adjacent to the exterior of the bag front wall. In FIG. 3, the display panel 22 is pivoted approximately around the junction of the front and top bag walls 23 to an operating position away from the bag front wall 45 with its display 11 properly oriented and in the line of sight of the operator/bag wearer so the display can be viewed and used. The display may have a touch screen for inputting information to the computer. The back side of the display panel may have controls such as one or more touch pads, switched, or buttons, for operating the computer. The bag may have an opening 49 in its top wall to access the bag interior where peripherals or miscellaneous cargo may be stored.

FIG. 4A, frontal view, and FIG. 4B, profile view, show the bag computer being worn by a manikin 46. The bag shoulder strap 47 holds the bag computer 2 to the operator so the computer will not fall and he can use two hands for operating the display panel 22 back side 4 controls or operate the manual character input device, in this case a keyboard 29. The display is in the line of sight 48 of the bag computer wearer.

FIG. 5A shows greater detail on the bag computer. The display panel 22 may be removable from the bag. The bag and display panel may be pivotally joined with complimentary mounting attachments, 58a and 59a, on the display panel and bag (respectively), also collectively known as "pivoting computer equipment mounts" (PCEM). The PCEM allows the display panel to pivot and leaves the back side of the display panel unobstructed so controls located there can be used. The bag mounting attachments may be located at or near the junction 23 of the bag's front wall 45 and top wall 30 and the display panel mounting attachments may be located at or near the attachment edge of the display panel.

The actual character of the PCEM may vary although all combinations serve to pivotally attach the display panel to the bag so that the display panel may rest in storage position with its front and back sides approximately parallel to the bag front wall or may be pivoted to an operating position in the line of sight of the operator/wearer for operation.

On the back side of the display panel there may be controls which are available for use when the operator holds the display panel while attached to the bag.

The back side of the display panel may have prop holder to match and be complimentary to a display panel's prop bar end and used to support the display panel at one or more angles relative to the bag front wall.

The display panel back side may include finger guides around or near specific controls to assist in finding these controls without looking.

The bag computer may include a manual character input device (MCID) 19 such as a keyboard or electric write pad pivotally attached to the bag's front wall 45.

Because the MCID and bag have different life times and because the operator might want to change the type of MCID used, the MCID and bag may be separated for replacement.

As with the display panel, the MCID may be pivotally and removably mounted to the bag using a pivoting computer equipment mount (PCEM).

One or more bag part PCEMs, also known as bag mounting attachments 59b, are found on the bag 1 and one or more complimentary MCID part PCEMs, also known as MCID mounting attachments 58b, are found on the MCID. The hinge means which allows pivoting may be part of the bag mounting attachment or part of the MCID mounting attachment or part of both.

The actual character of the PCEM may vary although all combinations serve to pivotally and removably attach the MCID to the bag so that the MCID may be in storage position covering and parallel to the display panel when it is parallel to and adjacent to the bag's front wall. When the computer is in operating position, the MCID pivots open about 180 degrees so that the operator may input information with his hands.

An electrical connection, such as a wire 8 and associated plug, to connect the MCID to the computing unit may lead from the MCID though an opening 50 in the bag front and/or bag mounting attachment to the interior of the bag.

The bag may include a cover, also called a primary cover, to protect and conceal the display panel when in storage position parallel and adjacent to the bag front. This primary cover may be a cover flap 31 or may be rigid and/or molded. The MCID and the primary cover may move together when shifting between storage position and operating position and there may by an attachment 68 on the primary cover to match a complimentary attachment on the back side of the MCID and help them move together.

Shown in FIG. 5B, an exploded view of the bag with the front wall removed, and in FIG. 5C, a view of the inside surface of the bag's front wall, some or all of the bag computer's computing equipment, such as the computing unit, batteries and communication equipment, may be mounted in a computer equipment mounting area on the exterior or in the interior of the bag 1 where the equipment may be connected electrically with the display panel and/or MCID 19 using, for example, an electrical wire 8 and associated plug(s) designed to lead through an opening 50 in the bag associated with the front wall or bag mounting attachment. The computing unit 10 may be removably mounted to a computing unit mounting assembly 52, such as a footing, pocket or bracket, fixed to the inside surface 51 of the bag's front 45. The computing unit may have connections, such as plugs 53 positioned to accept connections from the display panel and/or MCID. The computing unit mounting assembly may have openings 54 to correspond with the electrical connections and facilitate connection. Much of the remainder of the bag's interior may be left unoccupied so it may be used to hold miscellaneous cargo and/or peripherals.

Alternatively, the bag computer's computing equipment may be located in the display panel.

As shown in FIG. 6, the MCID 19 may alternatively be attached directly to the bag's primary cover which pivots on the bag's 1 front wall 45 to cover the display panel 22. In this case, the primary cover serves as the PCEM for the MCID. In the case shown, the cover flap 31 has one or more attachments 69, such as holes, bracket, clips or sliding fittings, on its inside surface 71 which match complimentary attachments 70 on the MCID back side or edges. An electrical connection, such as a wire 8 and associated plug, to connect the MCID to the computing unit may lead from the MCID though an opening 50 in the bag front, bag part PCEM and/or primary cover to the interior of the bag.

As shown in FIG. 7A (front side view), 7B (side edge view), 7C (attachment edge view), 7D and 7E, the manual character input device (MCID) has an approximately rectangular and panel-like shape. It has a front surface 24 facing up when the input device is pivoted perpendicular to the bag's front wall, a back surface 25 opposite the front surface, a proximal attachment edge 26 closest to the bag's front wall when the input device is pivoted perpendicular to the bag's front wall, a distal edges 27 opposite the attachment edge and two side edges 28. The input device may have a general use input/output tool, such as an infrared antenna, microphone or camera, located at its distal end or back side so it can be pointed to an external target. These may be positioned and aimed to align with the plane of the MCID front surface and facing away from the bag so that the operator may lift the MCID to aim the camera, microphone or communicator antenna at an external target. Communication with the bag computer may be by attachment edge electrical wire or wireless antenna. On the back side of the input device there may be other controls associated with operating the bag computer, camera 73, external communicator 74 antenna, microphone or other built in input/output tool. Input devices with single edge attachments, as with a PCEM, may have an attachment 68 on the back side or other surface matching a complimentary attachment on the inside of the primary cover so that they may both move together when shifted from the storage position to operating position.

If the manual character input device is a keyboard 29, it may be ten keys wide. This allows for full size keys for typing while still keeping the keyboard size proportional to the average bag. The keyboard would be the width of the keys "a" to ";" on a standard QWERTY keyboard. Three or four rows may be included. Thumb keys 75 substitute for essential keys farther to the right and left on the standard keyboard (for example, space, return, shift, backspace, tab, change keyboard, camera or external communicator controls, etc). The result is a keyboard with standard ¾ inch keys and totaling about 8" wide. The key rows may have the standard offset or be inline. Alternative key placement or other controls may be programmed with software.

To make the keyboard easier to use without looking, tactile guides 76 such as vertical thumb troughs, vertical finger ridges between the keys, depressions and/or outer edge palm ridges, may be included to assure finger position and to help stabilize the keyboard with the hands/palms.

The MCID may be an electronic write pad such as a touch pad surface activated with the touch of the fingers or stylus and supported by computer software to interpret and change images written on the touchpad into computer storable characters. The electronic write pad may include a storage place for a stylus.

The manual character input device may be electrically connected through the bag and its front wall to the bag's interior so that it may be removably connected with the computing unit. The electrical connection may be a wire 8 of an appropriate diameter and length (including any plug) leading from near the attachment edge of the manual character input device, through the attachment area 12 so that it may passing through an opening in the front wall of the bag and connecting with computer equipment mounted inside the bag. The electrical connection may be positions anywhere on or near the MCID attachment edge to facilitate connection with the computing unit. For example, the electrical connection may be toward the right or left side of the attachment edge so that it may match a plug on the side of the computing unit mounted inside of the bag's front wall. The bag front wall may have an opening to allow the wire to pass through. The wiring may be designed to pass through two layers of bag mounting attachment flap material and through the front wall to the bag's interior. The wire may lead through the clamp jaws 21 of a clamp attachment on the manual character input device attachment edge. There may be a gap, channel 20, notch or other cut out in the manual character input device's clamp area to allow an electrical connection, for example a wire with plug at the end, to pass from the manual character input device attachment edge, between the clamp jaws, through an opening between two layers of the bag's mounting attachment flap, through the bag's front wall and to the interior of the bag to connect with inside mounted computer without pinching the wire in the clamp when it is tightened around the attachment flap. By using a wires and plug that is part of the manual character input device, no wiring need be included in the bag thus simplifying bag construction.

Instead, the electrical connection with the computing unit may be wireless. In this case the MCID may include batteries and transceiver equipment.

The manual character input device may store over the display and it may have alignment structures 77 to align the MCID to the display panel, also on the bag front, to protect the display while in stored position. These structures may be on any edge or the front of the input device and may include walls, ridges or pins on the input device edges, may be wedged so to form a snug fit against the display and may include spacers to keep the keys from being depressed when stored. The structures may be molded into the MCID or attached to it. Including the input device, they may form a box-like enclosure open on one side (the display side). The alignment structures may also touch the bag's front wall or display hinge while closed to serve to protect the display from impact. They may be made of a material softer than the display so as to not scratch the display. The alignment structures on the input device sides may include cut outs 78 (option shown in dotted line) to allow easier access to the keys by the hands. There may be one or more clips, snaps, hooks or other fasteners to secure the input device to display/computer.

Figure 8:
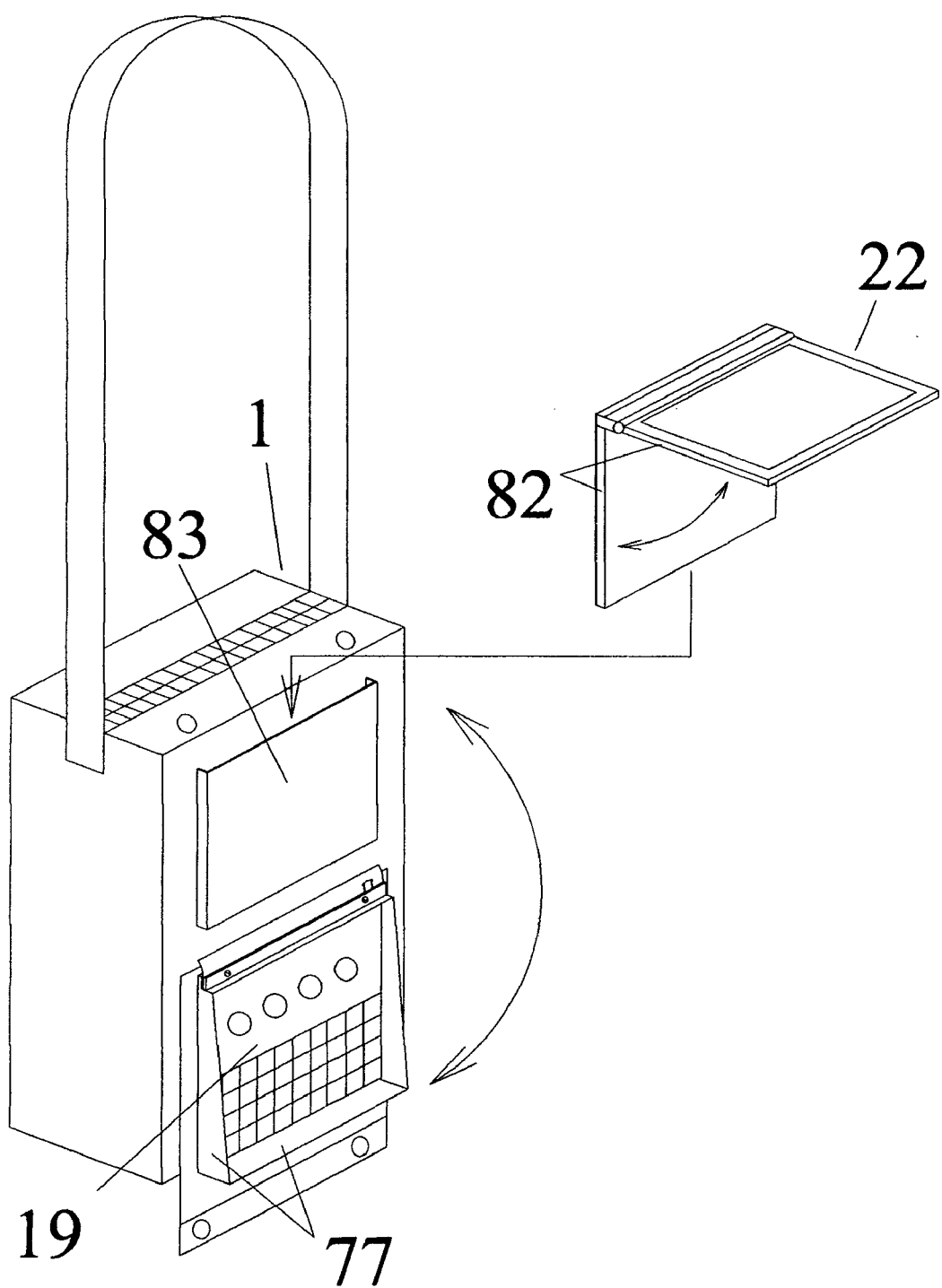
FIG. 8 This view shows that the MCID with alignment structures can be fitted to a bag computer which uses a two panel computer held to the bag with a holster instead of having a display panel mounted directly to the bag.

As shown in FIG. 8, the MCID 19 in any of its forms or embodiments may be adjusted in size, shape, alignment 77 structures and mounting characteristics to cover the display 22 on a bag computer using a two panel computer 82 mounted to the computer equipment mounting area on the outside of the bag 1 front 45 in, for example, a pocket, holster 83 or bracket. In this case the MCID and its alignment structures may cover both panels of the two panel computer and may make contact with the bag front.

Alternatively, as shown in FIG. 9, the manual character input portion of the device may be missing from the MCID. The remainder becomes a secondary cover 67 with appropriate size, shape and alignment structures 77 to cover and protect the bag computer display panel even if, for example, a touch screen is substituted for a separate character input device. Like a standard MCID, the secondary cover has a front side, opposite back side, an attachment edge closest to the bag, distal edge and two side edges. The secondary cover may have an input/output tool such as a camera 73c, microphone or communicator antenna 74c, shown in dotted lines, on its distal edge. These face away from the body and receptacle for exterior communication. If a camera, communicator antenna or other electronic equipment is located on the secondary cover, an electrical connection 8 may be provided to connect this equipment to the computing unit in the bag. The secondary cover may be attached to the bag using a PCEM with the MCID mounting attachment 58b on one edge of the secondary cover. Alternatively, the secondary cover may be attached to the inside surface bag's primary cover with matching attachments 70 between the primary cover and the secondary cover. Normally, the secondary cover is held in place over the display panel with the primary cover. However, the secondary cover may have its own attachments matching the bag or display panel to hold it in place over the display panel.

As shown in FIGS. 10A, 10B and 10C, the manual character input device may be subdivided into an input device body 79 and an input device insert 81.

In this way the input device body may act as a secondary cover to reduce weight or, alternatively, contain an input device insert which may include a keyboard FIG. 10B, an electronic write pad FIG. 10C or have some other removable/exchangeable manual input device equipment.

The input device body 79 is similar to the MCID described above but lacks the input device equipment, such as keys, touch inputs or supporting electronics, which is removable. It is panel-like, has a front surface 24 forming a receptacle 80 to receive an input device insert, an opposite back surface, an attachment edge 26 closest to the bag's front wall when the input device body is pivoted perpendicular to the bag's front wall, a distal edges 27 opposite the attachment edge and two side edges. When in operating position, the input device body front side is facing away from the bag's front wall where any input device insert mounted there is available for use.

As with the MCID described above, the input device body may be pivotally attach to the bag using MCID mounting attachments 58b on or near the input device body attachment edge and complimentary to the bag mounting attachments found on the bag front wall.

The input device body may, instead, be attached to the inside surface of the bag's primary cover. The MCID mounting attachments in this case may be located on the input device body back or edges.

The input device body may have attachments 5, such as clips, magnets or grooves, associated with the receptacle so that the input device insert can be physically held in place. The receptacle may have an electrical connection 9 to match an input device insert. The input device body may further have an electrical connection from the body to the computing unit. This connection may be a wire and plug 8 extending from near the attachment edge or may be wireless. Wireless communication may include batteries and transceiver equipment.

As with the MCID described above, the input device body may have alignment structures to shape the input device body into a cover to protect the bag's display panel.

The input device body may include an input/output tool, such as a camera, microphone or communicator antenna, on its distal edge and these may have electrical connections through the body and on to the computing unit. The camera 73a and/or communication 74a, shown in dotted lines, face away from the body and receptacle for exterior communication. Alternatively, if the camera 73b, microphone and/or communicator antenna 74b are located on the input device insert, the input device body or the alignment structures on the body may include one or more opening 72 to allow camera, microphone or communicator access to the outside environment. If the input device insert has a separate electrical connection 8 leading to the computing unit, the input device body or its alignment structures may have an opening 84 for that purpose. This may be on or near the attachment edge.

Input device inserts 81, are also panel-like and have a front surface 60 adapted to accept manual input from the operator.

An input device insert also has an opposite back surface, a proximal edge 61, a distal edge 62 and two side edges. The insert fits the body with the front surface exposed and the distal edge adjacent to the input device body distal edge. It may have physical attachments 7 to match complimentary attachments on the input device body and allow the insert to be removed. An input device insert may include an input/output tool, such as a camera, microphone or communicator antenna, on its distal edge.

The electrical connection between the input device insert and the computing unit in the bag may be by wire 8 directly from the insert through the bag front wall to the computing device. Alternatively, the insert electrical connection 6 may first connect to the input device body and continue from there using the body's electrical connection to the computing unit.

The input device insert may include a keyboard FIG. 10B as described above for a standard MCID. The input device insert may include an electronic write pad FIG. 10C as described above for a standard MCID.

The embodiments of the invention described herein are exemplary and numerous modifications, variations, and rearrangements can be readily envisioned to achieve an equivalent result, all of which are intended to be embraced within the scope of the appended claims.

The invention claimed is:

1. A portable apparatus for receiving computer equipment, the apparatus comprising:
  a. a bag comprised of a front wall including an exterior surface;
  b. a display attached to the bag and stored on the exterior surface of the bag front wall; and
  c. an input device body comprised of an attachment edge and a receptacle configured to receive an input device insert, wherein the input device body is attached to the exterior surface of the front wall, the input device body being pivotable to at least a storage position covering the display.

2. The apparatus of claim 1 wherein the input device body is further comprised of a cover, wherein the cover is pivotally attached to the front wall.

3. The apparatus of claim 2 wherein the input device body is further comprised of an attachment complimentary to an attachment on the cover, wherein the attachment removably attaches the input device to the cover.

4. The apparatus of claim 1, wherein the bag front wall is further comprised of an opening, the opening configured to allow an electrical connection from input device body through the bag front wall to an interior of the bag.

5. The apparatus of claim 1, wherein the input device body is further comprised of at least one input device mounting attachment on or near the attachment edge adapted to removably attach the input device body to the bag and pivot around the attachment edge.

6. The apparatus of claim 5, wherein the bag is further comprised of a bag mounting attachment on the bag front wall, the bag mounting attachment configured to match at least one input device mounting attachment on the input device body and removably join the input device body to the bag.

7. The apparatus of claim 5, wherein at least one input device mounting attachment is comprised of two jaws.

8. The apparatus of claim 1, wherein the input device body is further comprised of an alignment structure configured to shape the input device body to fit and protect the display.

9. The apparatus of claim 1, wherein the input device body is further comprised of an electrical connection configured to lead to an interior of the bag.

10. The apparatus of claim 1, wherein the input device body is further comprised of an input/output tool.

11. The apparatus of claim 1, further comprised of an input device insert fitted to the receptacle.

12. The apparatus of claim 11, wherein the input device insert is a keyboard.

13. The apparatus of claim 11, wherein the input device insert is an electronic write pad.

14. The apparatus of claim 11, wherein the input device insert is further comprised of an electrical connection from the input device insert to the input device body.

15. The apparatus of claim 11, wherein the input device insert is further comprised of an electrical connection from the input device insert to an interior of the bag.

16. An apparatus for protecting a display attachable to a bag, the apparatus comprising:
  a. an input device body comprised of an attachment edge;
  b. an alignment structure on the input device body, the alignment structure configured to shape the input device body to fit and protect the display attachable to the bag; and
  c. an input device mounting attachment on the input device body, the input device mounting attachment configured to attach the input device body to the bag, the input device body being pivotable to at least a storage position covering the display.

17. The apparatus of claim 16 wherein the input device body is further comprised of a cover, wherein the cover is pivotally attachable to the bag.

18. The apparatus of claim 17 wherein the input device body is further comprised of an attachment complimentary to an attachment on the cover, wherein the attachment removably attaches the input device to the cover.

19. The apparatus of claim 16, the input device mounting attachment is located on or near the attachment edge and adapted to removably attach the input device body to the bag and pivot around the attachment edge.

20. The apparatus of claim 19, wherein at least one input device mounting attachment is comprised of two jaws.

21. The apparatus of claim 16, wherein the input device body is further comprised of an electrical connection configured to lead to an interior of the bag.

22. The apparatus of claim 16, wherein the input device body is further comprised of an input/output tool.

23. The apparatus of claim 16 wherein the input device body is further comprised of a receptacle configured to receive an input device insert.

24. The apparatus of claim 23, further comprised of an input device insert fitted to the receptacle.

25. The apparatus of claim 24, wherein the input device insert is a keyboard.

26. The apparatus of claim 24, wherein the input device insert is an electronic write pad.

27. The apparatus of claim 24, wherein the input device insert is further comprised of an electrical connection from the input device insert to the input device body.

28. The apparatus of claim 24, wherein the input device insert is further comprised of an electrical connection from the input device insert to an interior of the bag.

29. A bag mounted apparatus for receiving computer equipment the apparatus comprising:
  a. an input device body comprised of an attachment edge and a receptacle configured to receive an input device insert; and b. at least one input device mounting attachment on or near the attachment edge and configured to removably attach the input device body to the bag and pivot around the attachment edge.

30. The apparatus of claim 29, wherein at least one input device mounting attachment is comprised of two jaws.

31. The apparatus of claim 29, wherein the input device body is further comprising an electrical connection configured to lead to an interior of the bag.

32. The apparatus of claim 29, wherein the input device body is further comprised of an input/output tool.

33. The apparatus of claim 29, further comprised of an input device insert fitted to the receptacle.

34. The apparatus of claim 33, wherein the input device insert is a keyboard.

35. The apparatus of claim 33, wherein the input device insert is an electronic write pad.

36. The apparatus of claim 33, wherein the input device insert is further comprised of an electrical connection from the input device insert to the input device body.

37. The apparatus of claim 33, wherein the input device insert is further comprised of an electrical connection from the input device insert to an interior of the bag.

* * * * *